US009098109B2

(12) United States Patent
Lappalainen et al.

(10) Patent No.: US 9,098,109 B2
(45) Date of Patent: Aug. 4, 2015

(54) ADAPTIVE DEVICE BEHAVIOR IN RESPONSE TO USER INTERACTION

(75) Inventors: Kristian Alexander Lappalainen, Oulu (FI); Mika Antero Tervonen, Oulu (FI); Timo Antero Huttunen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 100 days.

(21) Appl. No.: 13/277,375

(22) Filed: Oct. 20, 2011

(65) Prior Publication Data

US 2012/0185420 A1 Jul. 19, 2012

Related U.S. Application Data

(60) Provisional application No. 61/405,002, filed on Oct. 20, 2010.

(51) Int. Cl.
G06F 15/18 (2006.01)
G06F 3/01 (2006.01)
G06F 3/0346 (2013.01)

(52) U.S. Cl.
CPC .............. *G06F 3/011* (2013.01); *G06F 3/0346* (2013.01); *G06F 2203/011* (2013.01)

(58) Field of Classification Search
USPC ........................................................ 706/14
See application file for complete search history.

(56) References Cited

U.S. PATENT DOCUMENTS

| 7,671,758 | B1 | 3/2010 | Seidel et al. | |
|---|---|---|---|---|
| 2005/0212762 | A1 | 9/2005 | Pearcey | |
| 2008/0106518 | A1* | 5/2008 | Orlassino | 345/161 |
| 2008/0270939 | A1 | 10/2008 | Mueller | |
| 2009/0058801 | A1 | 3/2009 | Bull | |
| 2009/0320113 | A1 | 12/2009 | Larsen et al. | |
| 2010/0082516 | A1* | 4/2010 | Basu et al. | 706/47 |
| 2010/0202599 | A1* | 8/2010 | Hillis et al. | 379/93.21 |
| 2010/0216532 | A1 | 8/2010 | Halverson | |
| 2011/0283189 | A1* | 11/2011 | Mccarty | 715/707 |

OTHER PUBLICATIONS

International Search Report and Written Opinion for Application No. PCT/IB2011/054701 dated Mar. 14, 2012.
Search Report from European Patent Application No. 11 83 3957, dated May 26, 2014.

* cited by examiner

*Primary Examiner* — Kakali Chaki
*Assistant Examiner* — Michael Zidanic
(74) *Attorney, Agent, or Firm* — Alston & Bird LLP

(57) ABSTRACT

A manifestation of user frustration associated with an action currently being performed by an apparatus is detected. The action is modified so as to alleviate the user frustration. The apparatus determines whether the modification to the action results in alleviating the user frustration, and may store data that causes the modification to the action to be subsequently performed.

18 Claims, 5 Drawing Sheets

ADAPTIVE DEVICE BEHAVIOR IN RESPONSE TO USER INTERACTION

RELATED APPLICATIONS

This application claims the benefit of U.S. Provisional Application No. 61/405,002, filed Oct. 20, 2010, the content of which is incorporated herein by reference in its entirety.

TECHNICAL FIELD

This specification relates in general to electronic devices, and in particular to devices capable of adaptive behavior in response to user interaction.

BACKGROUND

Over the last few decades, electronic devices have become increasingly pervasive. While electronics in some form have been popular with consumers ever since the invention of radio, modern electronics have become ubiquitous to an unprecedented level due, at least in part, to the availability of inexpensive, mobile computing devices. These increasingly portable yet powerful devices can now perform a wide range of tasks formerly reserved for larger computers. Further, because of the communication and sensing capabilities included in such devices, they have spawned a wide range of new uses that have made them nearly indispensible to modern consumers.

As with their desktop counterparts, mobile computing devices must deal with communicating increasingly larger amounts of data to the users, and must interact with users in increasingly sophisticated ways. These interactions are especially challenging with mobile devices, because of their small size and need for power efficiency. Also, as with desktop computers, mobile devices now include software that is ever more complex and extensible. Such complexity inevitably leads to failures, which can range from mildly annoying to a level that renders some functionality unusable. In order to compete in an increasingly competitive mobile device market, these and other sources of user frustration must be addressed when developing such devices.

SUMMARY

The present specification discloses systems, apparatuses, computer programs, data structures, and methods for facilitating adapting behavior of a device based on detecting user frustration. In one embodiment, this involves detecting a manifestation of user frustration associated with an action currently being performed by an apparatus. The action is modified so as to alleviate the user frustration, and the apparatus determines whether the modification to the action results in alleviating the user frustration.

In one more particular configuration of this embodiment, the action may include signaling associated with a media session, and the manifestation of the user frustration may include repeated signaling operations initiated by a user related to the media session. In this configuration, the manifestation of the user frustration may further include a consideration of elapsed times between the repeated signaling operations initiated by the user. Also in this configuration, the modification to the action may involve the use of an alternative signaling operation in place of the repeated signaling operation.

In another particular configuration of this embodiment, an adaptive software component may causes the apparatus to receive data related to the manifestation of user frustration; select an alternative based on the data; and communicate a description of the alternative to facilitate modifying the action. Another particular configuration may involve storing data that causes the modification to the action to be subsequently performed in place of the action based on detecting that the modification to the action results in alleviating the user frustration. In yet another particular configuration, the manifestation of the user frustration may include a measurement made from an accelerometer coupled to the apparatus.

In another embodiment, network signaling is facilitated, the signaling being related to a media session in which a user is participating via a mobile device. Repeated signaling operations initiated by the user that are related to the media session are detected via an adaptive software component of the mobile device. The repeated signaling operations evidence a manifestation of user frustration associated with an action currently being performed by the mobile device in relation to the media session. The signaling operation is modified, via the adaptive software component, so as to alleviate the user frustration. It is determined whether the modification to the action results in alleviating the user frustration, and data that causes the modification to the action to be subsequently performed in place of the action is stored based on detecting that the modification to the action results in alleviating the user frustration. In a particular configuration of this embodiment, the manifestation of the user frustration may further include a measurement made from an accelerometer coupled to the apparatus. In another particular configuration of this embodiment, the media session may include a voice over Internet protocol session.

In another embodiment, an apparatus includes means for detecting a manifestation of user frustration associated with an action currently being performed by the apparatus; means for modifying the action so as to alleviate the user frustration; and means for determining, via the apparatus, whether the modification to the action results in alleviating the user frustration. The apparatus may optionally include means for receiving data related to the manifestation of user frustration; means for selecting an alternative based on the data; and means for communicating a description of the alternative to facilitate modifying the action. In another arrangement, the apparatus may include means for storing data that causes the modification to the action to be subsequently performed in place of the action based on detecting that the modification to the action results in alleviating the user frustration.

The above summary of the present invention is not intended to describe each disclosed embodiment or every implementation of the present invention. For a better understanding of variations and advantages, reference should be made to the drawings which form a further part hereof, and to accompanying descriptive matter, which illustrate and describe representative embodiments.

BRIEF DESCRIPTION OF THE DRAWINGS

In the following diagrams, the same reference numbers may be used to identify similar/same components in multiple figures.

DETAILED DESCRIPTION

Figure 1:
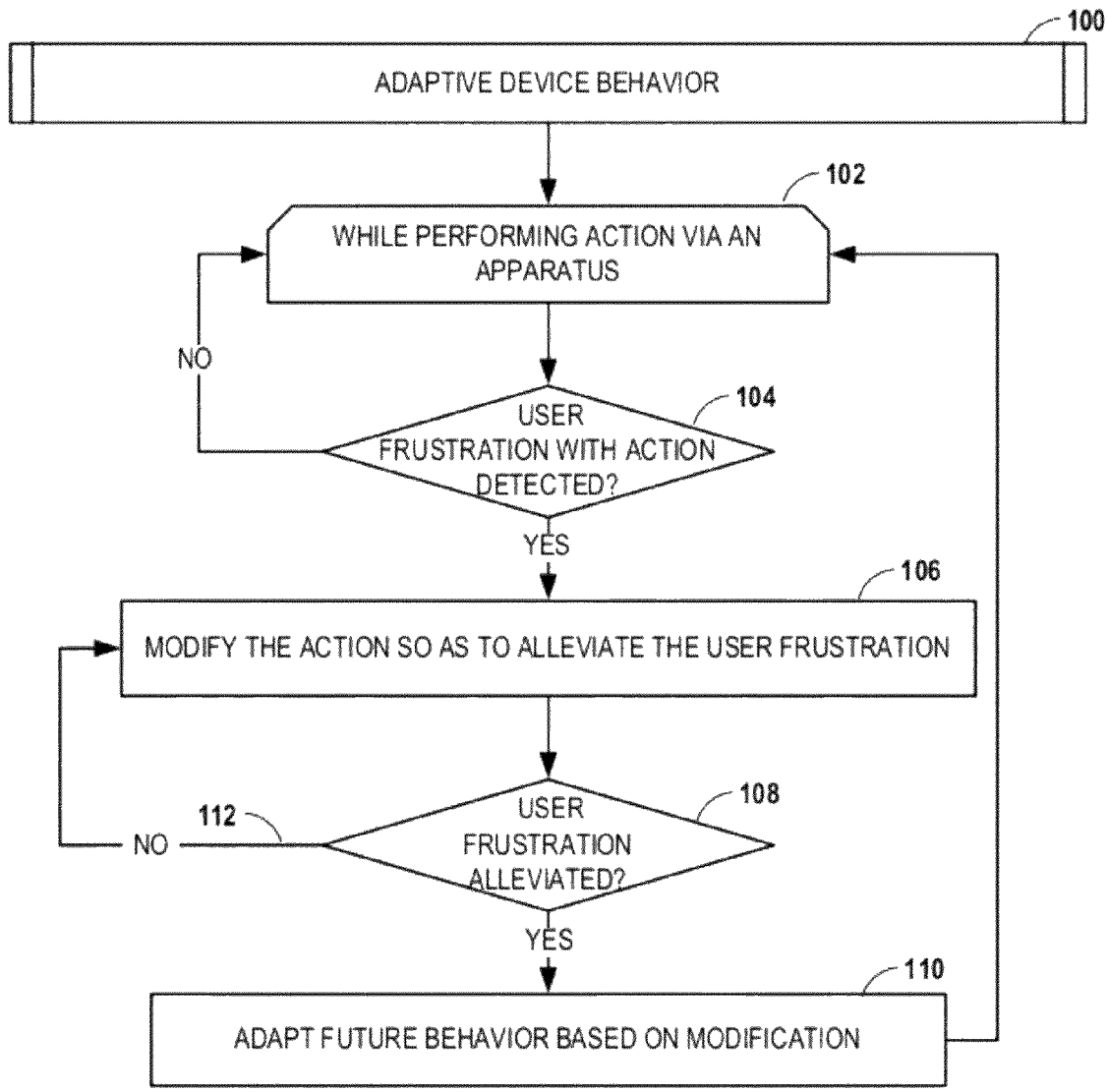
FIG. 1 is a flowchart illustrating a procedure according to an example embodiment.

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the present invention.

The present disclosure is generally related to user data processing devices such as computing devices, consumer electronics, portable electronics, etc. Generally, a device detects some aspect of user frustration with the device and adapts its behavior accordingly. In one example, a device may detect repeated, user-initiated actions that result in the same type of a signaling failure. In response, the device may try an altered/modified version of the signaling logic, e.g., based on a non-standard implementation of a signaling protocol. If the change in signaling logic results in a successful outcome, the device may store the non-standard behavior for future use with that particular client. While the many of the present examples are shown and described in terms of signaling logic, the detection of user frustration may be used to adapt other behaviors of the device for a wide range of applications and situations.

Generally, as electronic devices become ever more complicated to operate (e.g., more features, more interaction with other devices), there may be some users who experience a proportionate increase in frustration level using these devices. While some of this frustration may be due to unfamiliarity with a new technology, much may also be due to factors such as device failures and/or user interface problems/incompatibilities. As devices interact using networking and data transfer technologies, the chance for failure increases proportionally with the number of different protocols that are used for inter-device communications, and further with the number of additional, diverse devices with connected to using those protocols.

User interface incompatibilities are also becoming more problematic, particularly in portable devices which have limited physical space to communicate information with users. For example, a full alphanumeric keyboard, whether touchscreen or physical keys, is nearly a prerequisite for any device purporting to be a "smartphone" or similar mobile computing device. While many users prefer physical buttons because they can be detected tactilely, the buttons are often small and so marking of the buttons may be hard to see and/or hard to understand. For some simple controls such as volume controls, fairly standard user interface conventions can be used that enable most users to intuitively control the volume. However, a special purpose button (to automatically open a contact book, for example) may be much harder for users to take advantage of, e.g., due to unfamiliarity with the icon and/or application represented by the icon. Further, because of the small physical space occupied by such keys, mis-typing and/or accidental activation of special-purpose buttons may become a problem.

In the embodiments described below, one aspect that is discussed relates detection, by a device, of a user frustration level with the device. This is generally understood to relate to detecting/sensing any physical manifestations resulting from a user acting in a way that reflects the user being annoyed and/or otherwise having a problem with the device as it is being interacted with. Such interactions may generally include situations where the device is currently attempting to perform an operation at the user's request. These physical manifestations can be detected by any combination of operational logic, sensors and/or input-output devices, such as virtual/physical switches, accelerometers, pressure sensors, microphones, cameras, etc. For example, detection via sensors of any combination of loud sounds, sudden movements, excessive pressure on switches/casing, etc., may be indicative of user frustration.

In reference to FIG. 1, a flowchart illustrates a procedure 100 for adaptive device behavior according to an example embodiment. The device may occasionally or continuously monitor one or more actions, as represented by loop 102. A user frustration with the action may be detected 104, in which case the action may be modified 106 to alleviate the user frustration. Such modification may include, but is not limited to, changing protocol versions, changing an arrangement or formatting of data, modifying user interface mappings/behaviors, etc. If the modification 106 is detected 108 as being successful in alleviating frustration, then future behaviors may be adapted 110 accordingly. For example, if the frustration detected at 104 relates to inter-device communications, the modification 106 may be applied 110 as a configuration change for future communications with the target device. If the modification is detected 108 as not being successful in alleviating user frustration, then an alternate modification may be tried, as indicated by path 112. It will be appreciated that there may be a practical limit on the number of alternate modifications 106 available and/or the number of times it is reasonable to continue modifying behavior.

The device actions associated with the loop 102 may be operations of a particular program and/or part of the general operation of the device (e.g., monitored via the operating system). A number of loops 102 may execute in parallel on behalf of a number of different processes/components, and may each use different criteria for, e.g., detecting user frustration 104, 108, modifying actions 106, adapting behaviors 110, etc. The detection of user frustration 104, 108 may also be utilized for other purposes described in greater detail below, such as logging, failure prediction, etc.

One example where users may perform a predictable set of actions relates to call signaling. For example, if a user has just dialed a number, it is likely the user intends to engage in a communication session, e.g., voice call, and not perform some other action. Similarly, if the user has placed an ongoing call on hold, it is likely that the user will eventually wish to un-hold the call to resume the session. This latter scenario is described in FIG. 2, which is a sequence diagram illustrating adaptive behavior related to inter-device signaling according to an example embodiment.

Figure 2:
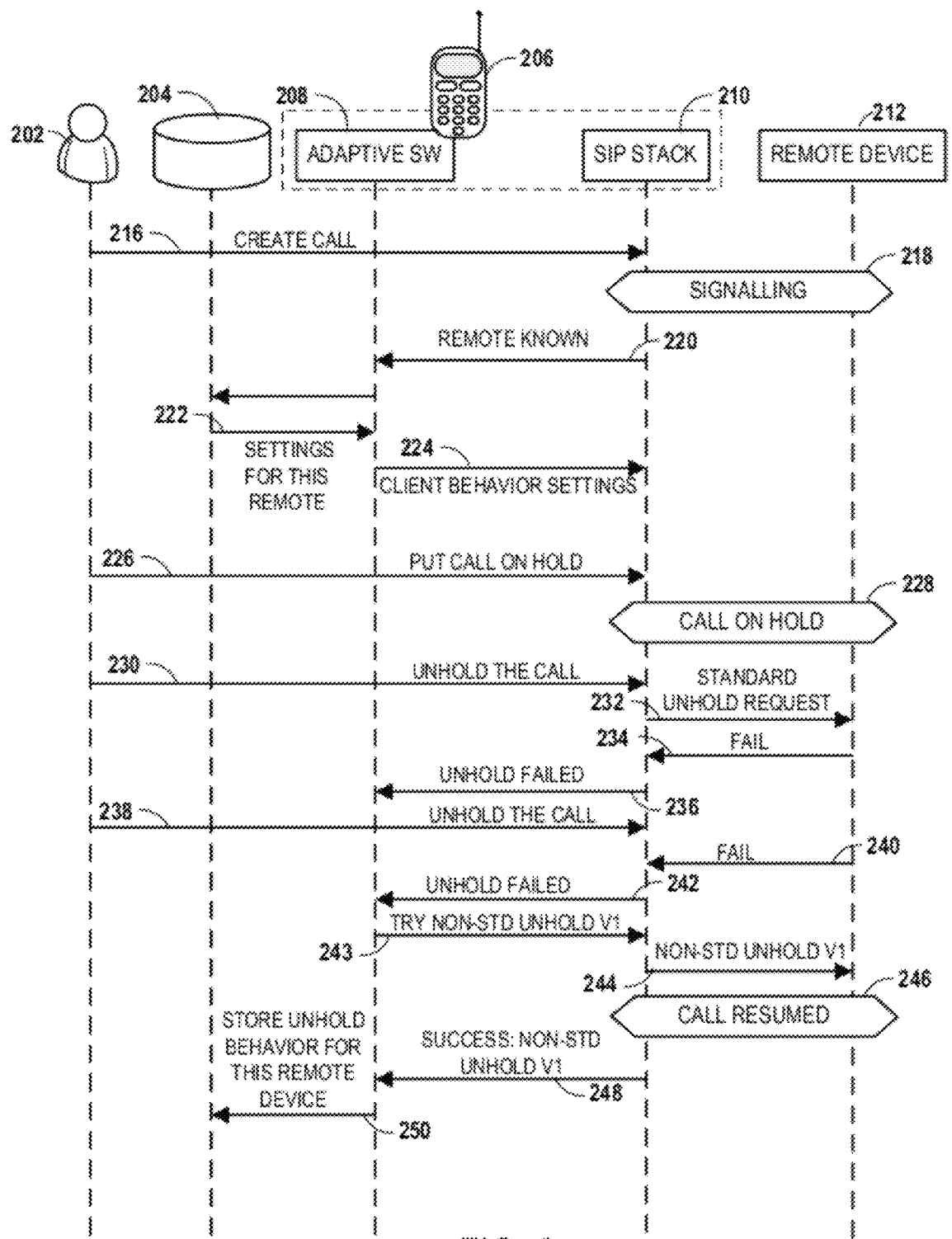
FIG. 2 is a sequence diagram illustrating an adaptive software component that modifies session signaling operations according to an example embodiment.

In FIG. 2, a user 202 interacts with an apparatus 206 (e.g., mobile device) that includes a Session Initiation Protocol (SIP) stack 210 and an adaptive software component 208 that facilitates adaptive behavior of at least the SIP stack 210. As is known in the art, SIP is a signaling protocol used for establishing and modifying connections between network devices, e.g., via Internet Protocol (IP) networks. The SIP standards may be applicable to a number of different types of communication, including Voice over IP (VoIP) and instant messaging. In the present example, the SIP stack 210 facilitates VoIP communications with a remote device 212, which may include any type of SIP-enabled device used by a remote party. Also shown in FIG. 2 is a database 204 for persistently storing settings data as described herein. The database 204 may be wholly or partly contained within the apparatus 206 and/or some other entity, such as a network server (not shown).

In this example, the user 202 initiates a call request 216 via the SIP stack 210. For the purposes of clarity, intermediate components that process the call request 216 (e.g., user interface components, VoIP application) are not represented. Nonetheless, it will be appreciated that the user 202 will somehow interact with hardware of the device 206 to initiate the request 216 (e.g., pressing a switch and/or touchscreen, voice recognition via a microphone, gestures detected via an accelerometer, etc.) In response to the request 216, the SIP stack 210 may initiate some sequence of signaling 218 with the remote device 212 using SIP, which may result in establishing a voice/video connection (not shown) between the apparatus 206 and the device 212 via an IP network.

At some point in the signaling 218, the SIP stack 210 may also positively identify the target party/device 212, as indicated by communication 220 with the adaptive software component 208. This identification may be made using any combination of media addresses, universally unique identifiers, and the like. In response to the identification 220 by the SIP stack, the adaptive software component 208 may obtain 222 settings applicable to the remote device 212, which are communicated 224 to the SIP stack 210.

These settings 222, 224 may include any combination of standard settings usable for any device with which the apparatus 206 may communicate in this way, and modifications to such settings. For example, if the apparatus 206 has not previously interacted with the remote device 212, default settings 222, 224 may be communicated to the SIP stack. Alternatively, the data 222, 224 may only include changes that have been discovered in response to previous interactions with this device 212. In this latter case where there have been no interactions with the remote device 212, the data 222, 224 may be an empty set, thereby signifying no changes to default behavior.

In either case, the settings 222, 224 may be used by the SIP stack 210, both as part of initial signaling 218 and for any subsequent signaling. Thus it may be possible that initial signaling interactions 218 (e.g., related to call setup) may include communications that occur both before and after retrieval of settings 220, 222, 224. After the call has been established, the SIP stack 210 may continue to utilize these settings 222, 224 for additional network interactions. One example of these additional interactions is where the user 202 requests 226 to put the call on hold.

Generally, the holding of a call may involve suspending or muting the voice/video transmissions from at least one party involved in the call. In this case, block 228 indicates the call is currently in the hold state. In order to resume the call, the user requests 230 "unholding" the call. This may involve, for example, toggling a switch or user interface element labeled "hold," first for the initial hold request 226 and a second time for the unhold request 230. In response to this request 230, the SIP stack 210 sends a standard unhold request 232 to the remote device 212, which returns a response 234 indicating the request 232 failed.

This failure of the unhold request is communicated 236 from the SIP stack 210 to the adaptive software component 208, which may do nothing at this time, except perhaps logging the failure. Again the user tries to request 238 an unhold, which again fails 240. This second failure 240 is again communicated 242 to the adaptive software component 208. The second communication 242 may be similar to the first 236, or may take an alternate form (e.g., explicit request for help), depending on which components 208, 210 are configured to interpret the repeated unhold requests 230, 238 as potentially corresponding to user frustration.

The repetition of the unhold requests 230, 238 shown here may be sufficient to indicate frustration on the part of the user, who is attempting to resume the call using the correct commands 230, 238, but is having no success. The attempts 230, 238 may have some other relative characteristics that are indicative of frustration, such as the time elapsed between subsequent requests. For example, attempts 230, 238 and subsequent requests (not shown) may occur in rapid succession. Other frustration detection mechanisms described in greater below may be used in combination with the detection of repeated attempts 230, 238.

In response to detecting frustration, e.g., via attempts 230, 238, the adaptive software component 208 suggests 243 to the SIP stack 210 to use an alternate, non-standard unhold request 244. This non-standard request 244 is successful, resulting in the call resuming 246. This success is communicated 248 from the SIP stack 210 to the adaptive software component 208, which may store 250 this information in the database 204 for future reference. For example, in later interactions with device 212 retrieval of settings similar 222, 224 will return a setting that indicates that non-standard unhold request 244 should be used when interacting with this device 212.

It will be appreciated that the adaptive behavior described in FIG. 2 may be applicable to any type of signaling interaction, including signaling involved in initial call connections, call disconnections, call waiting, call forwarding, conference calling, etc. Further, the detection of frustration due to repeated user signaling actions may not always be due to signaling failures. For example, even though signaling may have successfully resulted in, e.g., establishing a call session, there may be problems with the media connections used in the sessions (e.g., no sound, poor sound quality) that results in the user repeating some signaling action. This may be evidence that, for example, there are incompatibilities in the negotiated session description parameters used to establish the media channels. This may trigger, in response, renegotiation of session parameters to a more common/reliable session type.

Figure 3:
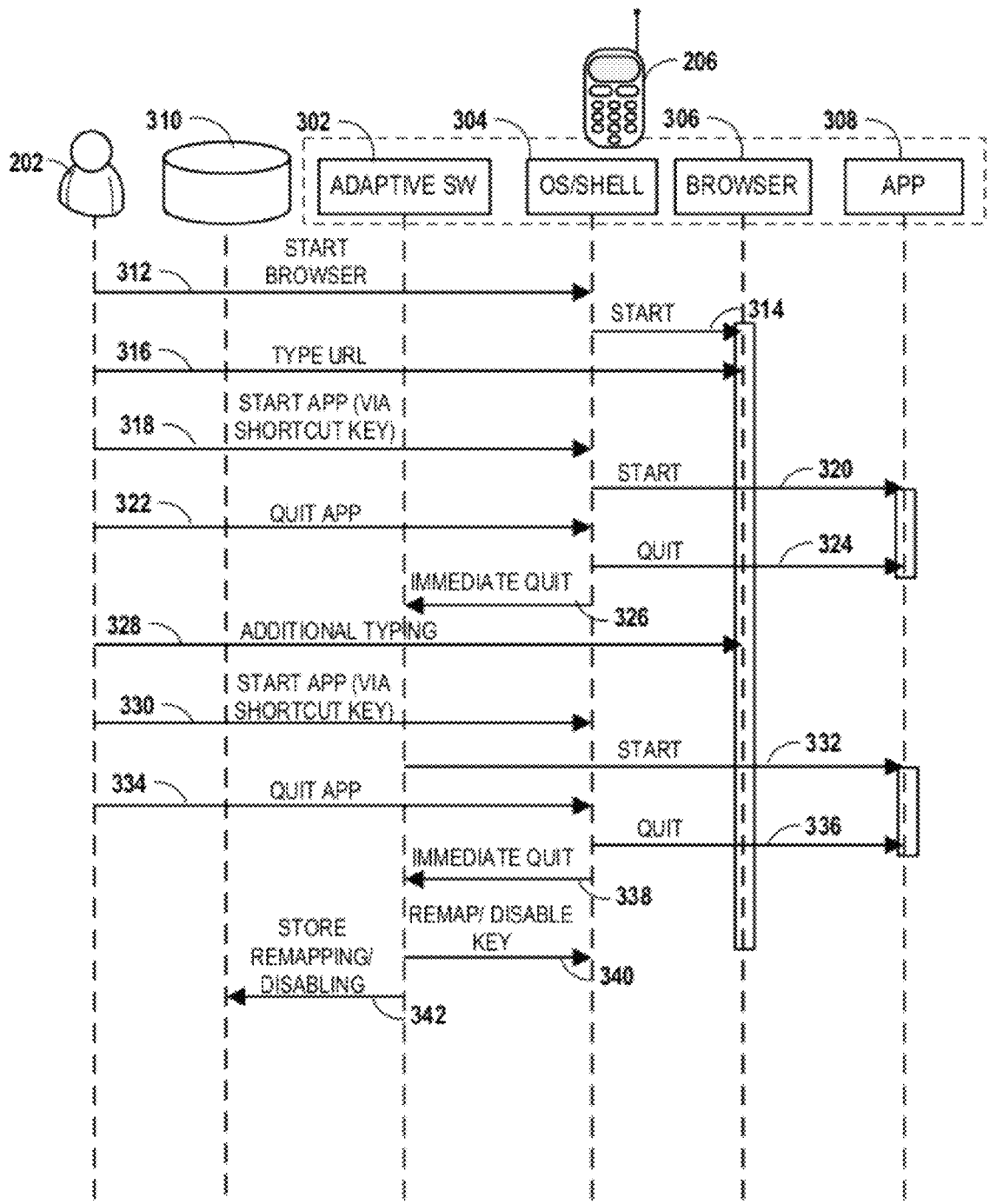
FIG. 3 is a sequence diagram illustrating an adaptive software component that modifies user interface operations according to an example embodiment.

The detection of user actions indicative of frustration need not be limited to inter-device transactions. In FIG. 3, a sequence diagram illustrates adaptive behavior related to detection of user interface problems according to an example embodiment. In this example, user 202 is interacting with mobile device 206 for interacting with software, in this example, a browser 306. A system software component, here labeled as OS/shell 304 may be responsible for receiving user inputs for such purposes as launching and closing applications, as well as passing user interface events to applications that are currently in "focus." Also accessible via the device 206 is an adaptive software component 302 and database 310 used respectively for adapting behaviors of the device 206 and storing those adaptations for future use.

Generally, this scenario involves the user 202 starting/launching the browser 306 via an input 312 to the OS/shell 304. This input 312 may include user interface interactions known in the art, such as selecting an icon, pressing a special hardware key, etc. In response, the OS/shell 304 starts 314 the browser 306. The user 202 can thereafter interact with the browser 306, e.g., by typing 316 in a Uniform Resource Locator (URL) to access a web page or the like.

In this scenario, the device 206 also includes special-purpose hardware or software keys used to instantly launch another application 308. As the device 206 is a portable unit, the user interface hardware may be relatively small or otherwise not well suited to the user 202. This increases the chance that the user 202 may accidently actuate the special-purpose key when trying to perform some other action. This is represented by interactions 318, 320 which represent an accidental press of the special-purpose key while attempting to type 316 the URL. In response, application 308 is started via the OS/shell 304, which removes focus from the browser application 306. This disrupts the user 202, who now has to quit 322, 324 the recently launched application 308.

This action of the user 202, the launching 318 and immediate quitting 322, 324 is communicated 326 to the adaptive software component 302, as it is indicative that the launch 318 was unintended. While the user is again typing 328 in the browser 306 (either during this session or in another session) the accidental launch 330, 332, and immediate quite 334, 336 occurs again, and is communicated 338 to the adaptive software component 302. After the component 302 has detected this or similar communications relative to this application 308 and special-purpose key, an adaptation 340 may be offered to remap or disable the special purpose key, and this may be stored 342 for future reference.

Such disabling/remapping 340 may be temporary, e.g., only when the browser 306 is in focus, or permanent. If it is determined that the application 308 is never used by the user 202, or at least never started via the special key, then permanent disabling may be appropriate. In other cases, it may be determined that the special key is activated whenever the user 202 is trying to type a nearby key. In such a case, the special key could be remapped to the nearby key, thereby acting in accordance with the user's desire, even if such action is unintentional. If the disabling/remapping is only desired when the browser 306 is operating, then this setting could be read (e.g., similar to interactions 220, 222, and 224 in FIG. 2) from the database 310 and applied to the browser 306 as part of the starting command 314.

Figure 4:
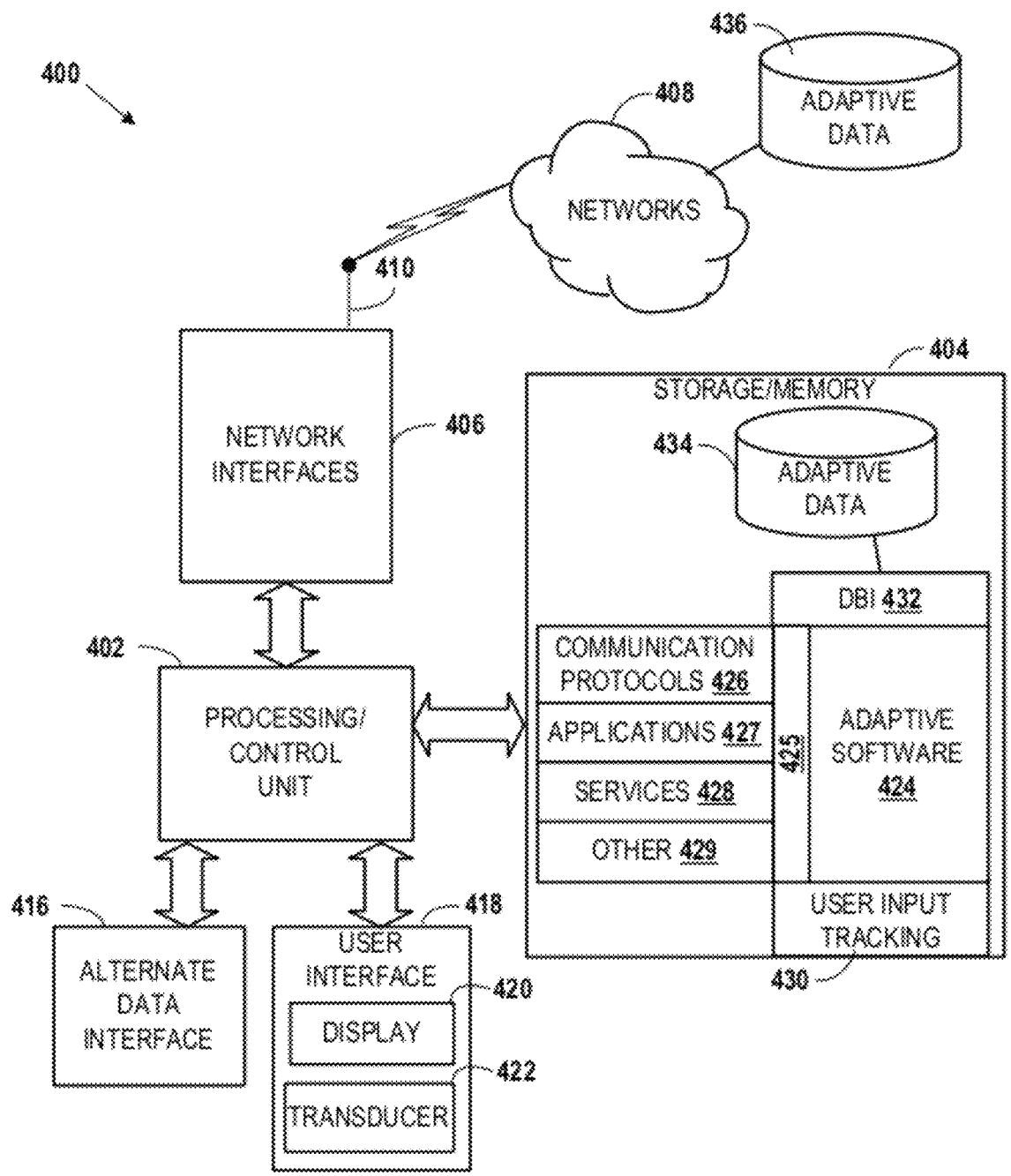
FIG. 4 is a block diagram of a user apparatus and system according to an example embodiment.

Many types of apparatuses may include adaptive features that detect and attempt to ultimately reduce user frustration as described herein. Users are increasingly using mobile communications devices (e.g., cellular phones), and these devices may be susceptible to user frustration as described herein. In reference now to FIG. 4, an example embodiment is illustrated of a representative mobile apparatus 400 capable of carrying out operations in accordance with example embodiments of the invention. The mobile apparatus 400 of FIG. 4 is provided as a representative example of a computing environment in which the principles of the present invention may be applied. Those of ordinary skill in the art will appreciate that the present invention is equally applicable in a variety of other currently known and future mobile and landline computing environments.

The user apparatus 400 may include, for example, a mobile apparatus, mobile phone, mobile communication device, mobile computer, laptop computer, desktop computer, server, phone device, video phone, conference phone, television apparatus, digital video recorder (DVR), set-top box (STB), radio apparatus, audio/video player, game device, positioning device, digital camera/camcorder, and/or the like, or any combination thereof. As described in greater detail below, the user apparatus 400 may further include adaptive software capabilities such as described regarding the mobile apparatus 206 shown and described in FIGS. 2 and 3.

The processing unit 402 controls the basic functions of the apparatus 400. Those functions may be configured as instructions stored in a program storage/memory 404. In an example embodiment of the invention, the program modules associated with the storage/memory 404 are stored in non-volatile electrically-erasable, programmable read-only memory (EEPROM), flash read-only memory (ROM), hard-drive, etc. so that the information is not lost upon power down of the mobile terminal. The relevant software for carrying out operations in accordance with the present invention may also be provided via computer program product, computer-readable medium, and/or be transmitted to the mobile apparatus 400 via data signals (e.g., downloaded electronically via one or more networks, such as the Internet and intermediate wireless networks).

The mobile apparatus 400 may include hardware and software components coupled to the processing/control unit 402. The mobile apparatus 400 may include multiple network interfaces 406 for maintaining any combination of wired or wireless data connections. The network interfaces 406 may include wireless data transmission circuitry such as a digital signal processor (DSP) employed to perform a variety of functions, including analog-to-digital (A/D) conversion, digital-to-analog (D/A) conversion, speech coding/decoding, encryption/decryption, error detection and correction, bit stream translation, filtering, etc.

The network interfaces 406 may include a transceiver, generally coupled to an antenna 410 that transmits the outgoing radio signals and receives the incoming radio signals associated with the wireless device. These components may enable the apparatus 400 to join in one or more communication networks 408, including mobile service provider networks, local networks, and public infrastructure networks such as the Internet. The network interface 406 may also include software modules for handling one or more network common network data transfer protocols, such as SSDP, HTTP, FTP, SMTP, SMS, MMS, etc.

The mobile apparatus 400 may also include an alternate network/data interface 416 coupled to the processing/control unit 402. The alternate data interface 416 may include the ability to communicate via secondary data paths using any type of data transmission medium, including wired and wireless mediums. Examples of alternate data interfaces 416 include USB, Bluetooth, RFID, Ethernet, 402.11 Wi-Fi, IRDA, Ultra Wide Band, WiBree, GPS, etc. These alternate interfaces 416 may also be capable of communicating via the networks 408, or via direct and/or peer-to-peer communications links.

The processor 402 is also coupled to user-interface hardware 418 associated with the mobile terminal. The user-interface 418 of the mobile terminal may include a display 420, such as a light-emitting diode (LED) and/or liquid crystal display (LCD) device. The user-interface hardware 418 also may include a transducer 422, such as an input device capable of receiving user inputs. The transducer 422 may also include sensing devices capable of measuring local conditions (e.g., location temperature, acceleration, orientation, proximity, etc.) and producing media (e.g., text, still pictures, video, sound, etc). Other user-interface hardware/software may be included in the interface 418, such as keypads, speakers, microphones, voice commands, switches, touch pad/screen, pointing devices, trackball, joystick, vibration generators, lights, accelerometers, etc. These and other user-interface components are coupled to the processor 402 as is known in the art.

The program storage/memory 404 includes operating systems for carrying out functions and applications associated with functions on the mobile apparatus 400. The program storage 404 may include one or more of read-only memory (ROM), flash ROM, programmable and/or erasable ROM, random access memory (RAM), subscriber interface module (SIM), wireless interface module (WIM), smart card, hard drive, computer program product, and removable memory device. The storage/memory 404 may also include interface modules such as operating system drivers, middleware, hardware abstraction layers, protocol stacks, and other software that facilitates accessing hardware such as user interface 418, alternate interface 416, and network hardware 406.

The storage/memory 404 of the mobile apparatus 400 may also include specialized software modules for performing functions according to example embodiments discussed above. For example, the program storage/memory 404 includes an adaptive software component 424 that may interact with and/or modify the behavior of other software components, such as communication protocols 426, applications 427, services 428, and any other operational/functional component 429. The adaptive software component 424 may be a separate module and/or be included as part of the respective software components 426-429.

Generally, the adaptive software component 424 monitors user-initiated events that affect other components 426-429, either alone or in combination, and attempts to detect patterns in those events that reflect user frustration. Such events may include, but are not limited to, actions that appear to that outside expected use-case scenarios, actions that are repeated, e.g., within a short amount of time of each other, etc. The context of these actions may also be important, e.g., often occurring when performing a particular task or operation, in a particular location or time of day, when connecting via a particular network, etc. The adaptive software 424 may take into account other physical manifestations that are indicative of user frustration, as represented by user input tracking module 430.

Generally, user input tracking module 430 may, either independently or in conjunction with tracking user input actions directed to components 426-429, detect physical manifestations of user frustration not detected by the components 426-429 themselves, such as shaking/shocks, rapid switching of position (e.g., away from the user's ear and back again), random mashing of keys, loud noises, unusually hard keypresses, etc. These physical manifestations may be detected via user interface hardware 418. The tracking module 430 may regularly monitor sensor outputs from this hardware, and may use these regular measurements to profile typical behavior for each user. In the context of detecting potential user frustration, current sensor outputs may be monitored while one or more components 426-429 are in operation, and compared to these typical behavior profiles. Sensor readings in this context that highly deviate from the typical profile may be indicative of user frustration. In conjunction with other contextual data, such sensor readings can help in suggesting fixes to solve potential problems.

In order to suggest fixes, the adaptive software 424 (if configured as a separate component) may include an application program interface (API) 425 that allows, for potentially any application, tracking actions that may give rise to user frustration, and to suggest fixes to alleviate that frustration. For example, communication protocol module 426 may register, via API 425, when particular method being invoked over a network. If repeated invocations and failures of this method are detected (and if these invocations possibly satisfy some other criteria, such as how fast the invocations are repeated, device/application context, etc.), the adaptive software 424 may perform a lookup of known alternatives to the methods, e.g., different versions, non-standard versions, alternative methods that may achieve the same result. These alternatives may be communicated back to the module 426 via the API 425. Similarly, the API 425 may include hooks into the operating system that detect particular user interface operations that are repeated and then cancelled regularly in one or more components 426-429. In response, the user interface hardware (e.g., keys, menus) may be remapped in software or otherwise adapted to prevent the user from having to cancel the unwanted operation.

If a problem is identified and fixed, the solution may be stored in a database 434 that is accessed via a database interface (DBI) 432. This stored data may be accessed at a later time to perform the adapted behavior as needed. The database 434 and DBI 432 may also contain data that describes potential fixes that may be tried by the adaptive software component 424. For example, the database 434 may contain a hierarchical lookup format that allows identifying particular problems. For example, the hierarchy could identify applications at the highest level, and the lower levels could identify subsystems and methods, such as: VoIP→Networking→SIP→UNHOLD, Browser→Javascript→window.resizeTo, Shell→ShortcutKeys→Calendar→LaunchAbort, etc.

The database 434 may be entirely local to the apparatus 400, or may be partly or completely located (e.g., and accessible via the DBI 434) on the network 408, as represented by network database 436. Generally, the network database 436 may be intended for a large number of different devices, and therefore the apparatus 400 may only need access a subset of such a database 436. One advantage of a network database 436 is that it enables regular updating of the algorithms and data used by the adaptive software component 424. Also, occurrences of successful adaptations by individual devices may be fed back to the database 436, allowing the system to improve its collective performance, and/or to spot trends in inter-device interaction failures, for example.

Generally, the behavior of the adaptive software 424 as it operates in a population of devices may be of interest to a centralized entity, such as a device manufacturer, software developer, and/or network service provider. Even if the adaptive software 424 is unable to find a solution to a particular issue, identification of the similar issues on a large number of devices may be beneficial in spotting trends that can be proactively fixed by, e.g., issuing a software update. Accordingly, the adaptive software 424 may be capable of interacting with a centralized network service for e.g., bug-tracking, as well as previously mentioned uses such as acting as a remote database 436.

The apparatus 400 of FIG. 4 is only one example of a device that may carry out operations according to the embodiments described herein. For example, the apparatus includes example means for detecting a manifestation of user frustration associated with an action currently being performed by the apparatus, shown here as user interface 418, tracking component 430, processing unit 402, adaptive software 424, API 425, components 426-429, etc. Such means may also include, for example, external components accessible via networks 408 (e.g., Web service) and/or external devices/services accessible via alternative data interface 416. An example of the latter may include a wearable device that measures biometric data or the like that may be communicated to the apparatus 400 for purposes such as detecting a manifestation of user frustration.

Similarly, the apparatus may include means for modifying the action so as to alleviate the user frustration, which may include the processing unit 402, adaptive software 424, DBI 432, databases 434, 436, network interfaces 406, components 426-429, etc. These means may also include external devices and/or services that may be accessible by the apparatus 400, e.g., via interfaces 406, 416. For example, the modification to the action may include communicating adaptive data 434, 436 to a remote device instead of and/or in addition to applying the change locally. The apparatus 400 may also include means for determining, via the apparatus, whether the modification to the action results in alleviating the user frustration. This may include any combination of user interface 418, tracking component 430, processing unit 402, adaptive software 424, DBI 432, databases 434, 436, network interfaces 406, API 425, components 426-429, etc.

Figure 5:
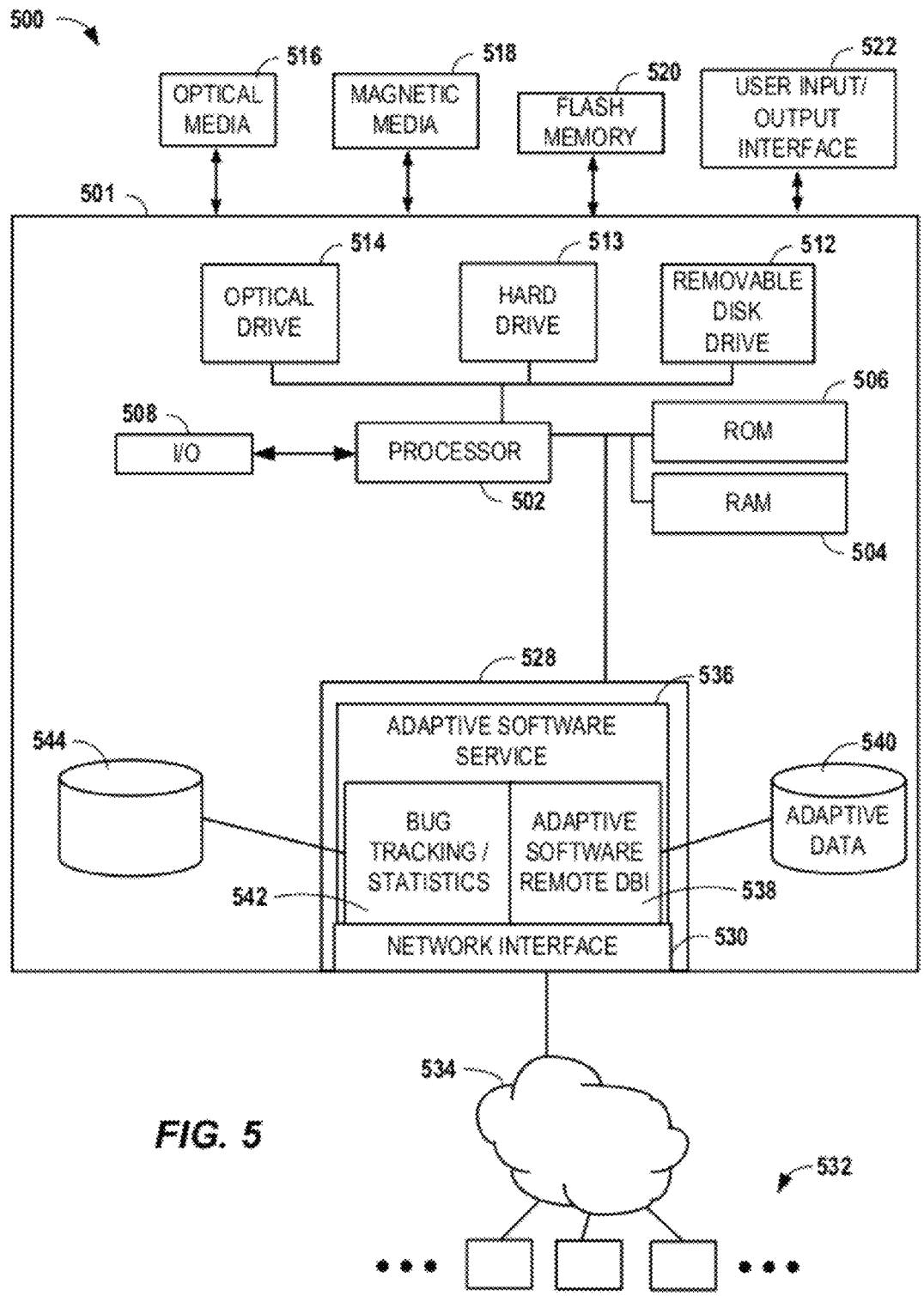
FIG. 5 is a block diagram of a server apparatus and system according to an example embodiment.

In reference now to FIG. 5, a block diagram provides details of a network service device 500 that may interact with adaptive software clients according to example embodiments described herein. The device 500 may be implemented via one or more conventional computing arrangements 501. The computing arrangement 501 may include custom or general-purpose electronic components. The computing arrangement 501 include one or more central processors (CPU) 502 that may be coupled to random access memory (RAM) 504 and/or read-only memory (ROM) 506. The ROM 506 may include various types of storage media, such as programmable ROM (PROM), erasable PROM (EPROM), etc. The processor 502 may communicate with other internal and external components through input/output (I/O) circuitry 508. The processor 502 may include one or more processing cores, and may include a combination of general-purpose and special-purpose processors that reside in independent functional modules (e.g., chipsets). The processor 502 carries out a variety of functions as is known in the art, as dictated by fixed logic, software instructions, and/or firmware instructions.

The computing arrangement 501 may include one or more data storage devices, including removable disk drives 512, hard drives 513, optical drives 514, and other hardware capable of reading and/or storing information. In one embodiment, software for carrying out the operations in accordance with the present invention may be stored and distributed on optical media 516, magnetic media 518, flash memory 520, or other form of media capable of portably storing information. These storage media may be inserted into, and read by, devices such as the optical drive 514, the removable disk drive 512, I/O ports 508 etc. The software may also be transmitted to computing arrangement 501 via data signals, such as being downloaded electronically via networks, such as the Internet. The computing arrangement 501 may be coupled to a user input/output interface 522 for user interaction. The user input/output interface 522 may include apparatus such as a mouse, keyboard, microphone, speaker, touch pad, touch screen, voice-recognition system, monitor, LED display, LCD display, etc.

The device 500 is configured with software that may be stored on any combination of memory 504 and persistent storage (e.g., hard drive 513). Such software may be contained in fixed logic or read-only memory 506, or placed in read-write memory 504 via portable computer-readable storage media and computer program products, including media such as read-only-memory magnetic disks, optical media, flash memory devices, fixed logic, read-only memory, etc. The software may also placed in memory 506 by way of data transmission links coupled to input-output busses 508. Such data transmission links may include wired/wireless network interfaces, Universal Serial Bus (USB) interfaces, etc.

The software generally includes instructions 528 that cause the processor 502 to operate with other computer hardware to provide the service functions described herein. The instructions 528 may include a network interface 530 that facilitates communication with user devices 532 of a local network 534. The network interface 530 may include a combination of hardware and software components, including media access circuitry, drivers, programs, and protocol modules. The network interface 530 may also include software modules for handling one or more network common network data transfer protocols, such as Simple Service Discovery Protocol (SSDP), HTTP, File Transfer Protocol (FTP), Simple Mail Transport Protocol (SMTP), Short Message Service (SMS), Multimedia Message Service (MMS), etc.

The network interface 530 may be a generic module that supports specific network interaction between user devices 532 and an adaptive software service module 536. The network interface 530 and adaptive software service module 536 may, individually or in combination, communicate data generally related to adaptive software components residing on and/or operating on user devices 532. For example, the module 536 may include a remote DBI 538 and associated database 540 that may determine and/or suggest adaptive behavior in response to frustration-inducing events detected by the devices 532. The DBI 538 and database 540 may also store adaptations that have been found to be successful for later application to one or more of the devices 532.

The module 536 may also include a component 542 for tracking statistics and similar data related to performance of the adaptive components of the user devices 532. This data may be processed, analyzed, and/or stored to a persistent storage device 544. Data processed by component 542 may be of a more general nature, such as being able to gauge which operations/applications tend to induce the most frustration, indicators of inter-peer incompatibilities, indicators of device-to-server incompatibilities, etc. These functions may be independent of or integral to data collected via DBI 538 and stored with adaptive data 540. Data 544 collected by component 542 may be cross correlated to other data sources, such as bug reporting and tracking databases (not shown).

For purposes of illustration, the operation of the device 500 is described in terms of functional circuit/software modules that interact to provide particular results. Those skilled in the art will appreciate that other arrangements of functional modules are possible. Further, one skilled in the art can readily implement such described functionality, either at a modular level or as a whole, using knowledge generally known in the art. The computing structure 501 is only a representative example of network infrastructure hardware that can be used to provide device selection services as described herein. Generally, the functions of the computing device 500 can be distributed over a large number of processing and network elements, and can be integrated with other services, such as Web services, gateways, mobile communications messaging, etc. For example, some aspects of the device 500 may be implemented in devices and/or intermediaries such as shown in FIGS. 2-4.

The foregoing description of the example embodiments has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. An apparatus, comprising:
   at least one processor and at least one memory including computer program code, the at least one memory and the computer program code configured to, with the at least one processor, cause the apparatus at least to perform:
   detect a manifestation of user frustration associated with an action currently being performed by the apparatus, wherein the manifestation comprises an accidental launch and immediate quitting of an application;

determine a context of the manifestation of user frustration, wherein the context comprises one or more of a set of circumstances relating to the manifestation of user frustration;

modify the action in view of the context so as to alleviate the user frustration, wherein modifying the action comprises remapping or disabling a user input;

determine whether the modification to the action results in alleviating the user frustration; and cause data to be stored that causes the modification to the action to be subsequently performed in association with the action in response to detecting that the modification to the action results in alleviating the user frustration.

2. The apparatus of claim 1, wherein the action comprises signaling associated with a media session, and wherein the manifestation of the user frustration comprises repeated signaling operations initiated by the user related to the media session.

3. The apparatus of claim 2, wherein the manifestation of the user frustration further comprises a consideration of elapsed times between the repeated signaling operations initiated by the user.

4. The apparatus of claim 2, wherein the modification to the action further comprises the use of an alternative signaling operation in place of the repeated signaling operation.

5. The apparatus of claim 1, wherein the computer program code comprises an adaptive software component, and wherein the adaptive software component causes the apparatus to perform:

receive data related to the manifestation of the user frustration;

select an alternative action based on the data; and communicate a description of the alternative action to facilitate modifying the action.

6. The apparatus of claim 1, wherein the manifestation of the user frustration comprises a measurement made from an accelerometer coupled to the apparatus.

7. A method comprising:

detecting a manifestation of user frustration associated with an action currently being performed by an apparatus, wherein the manifestation comprises an accidental launch and immediate quitting of an application;

determining a context of the manifestation of user frustration, wherein the context comprises one or more of a set of circumstances relating to the manifestation of user frustration;

modifying the action in view of the context so as to alleviate the user frustration, wherein modifying the action comprises remapping or disabling a user input;

determining, via the apparatus, whether the modification to the action results in alleviating the user frustration; and causing data to be stored that causes the modification to the action to be subsequently performed in association with the action in response to detecting that the modification to the action results in alleviating the user frustration.

8. The method of claim 7, wherein the action comprises signaling associated with a media session.

9. The method of claim 8, wherein the manifestation of the user frustration comprises repeated signaling operations initiated by a user related to the media session, and wherein the manifestation of the user frustration further comprises a consideration of elapsed times between the repeated signaling operations initiated by the user.

10. The method of claim 8, wherein the modification to the action further comprises the use of an alternative signaling operation in place of the repeated signaling operation.

11. The method of claim 10, wherein the media session comprises a voice over Internet protocol session.

12. The method of claim 7, further comprising:

receiving, via an adaptive software component of the apparatus, data related to the manifestation of the user frustration;

selecting, via the adaptive software component, an alternative action based on the data; and communicating, from the adaptive software component, a description of the alternative action to facilitate modifying the action.

13. The method of claim 7, wherein the manifestation of the user frustration comprises a measurement made from an accelerometer coupled to the apparatus.

14. A computer program product comprising at least one non-transitory computer-readable medium having computer-readable program instructions stored therein, the computer-readable program instructions comprising:

program instructions configured to detect a manifestation of user frustration associated with an action currently being performed by an apparatus, wherein the manifestation comprises an accidental launch and immediate quitting of an application;

program instructions configured to determine a context of the manifestation of user frustration, wherein the context comprises one or more of a set of circumstances relating to the manifestation of user frustration;

program instructions configured to modify the action in view of the context so as to alleviate the user frustration, wherein the program instructions configured to modify the action comprise program instructions configured to remap or disable a user input;

program instructions configured to determine whether the modification to the action results in alleviating the user frustration; and program instructions configured to cause data to be stored that causes the modification to the action to be subsequently performed in association with the action based on detecting that the modification to the action results in alleviating the user frustration.

15. The computer program product of claim 14 further comprising:

program instructions configured to receive data related to the manifestation of user frustration;

program instructions configured to select an alternative action based on the data; and program instructions configured to communicate a description of the alternative action to facilitate modifying the action.

16. The computer program product of claim 14, wherein the modification to the action further comprises the use of an alternative signaling operation in place of the repeated signaling operation.

17. The apparatus of claim 1, wherein the apparatus is further caused to provide for transmitting information regarding the modification to the action and information regarding whether the modification to the action results in alleviating the user frustration.

18. The method of claim 7, further comprising:

providing for transmission of information regarding the modification to the action and information regarding whether the modification to the action results in alleviating the user frustration.

* * * * *